United States Patent Office 3,100,988
Patented Aug. 20, 1963

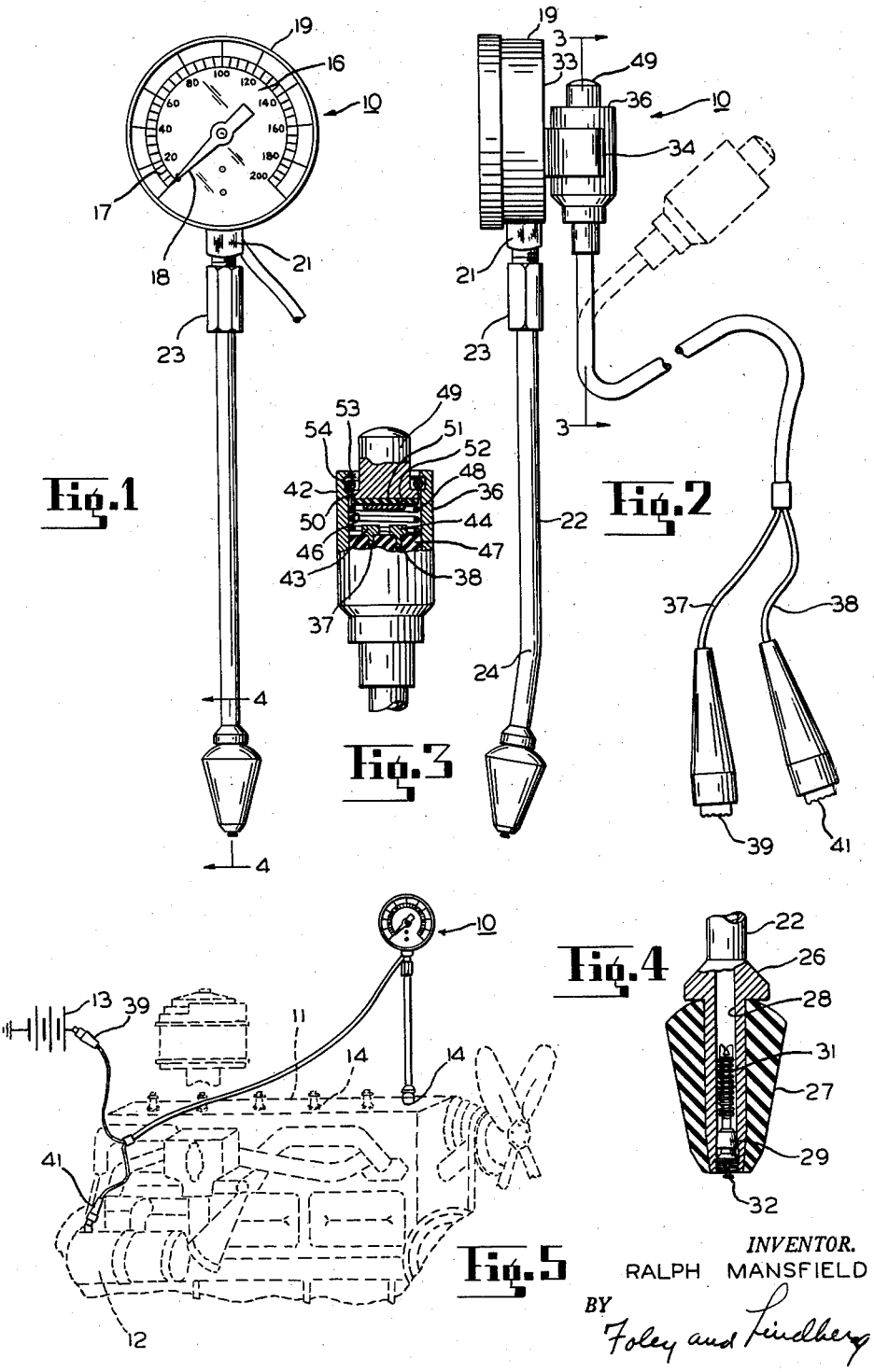

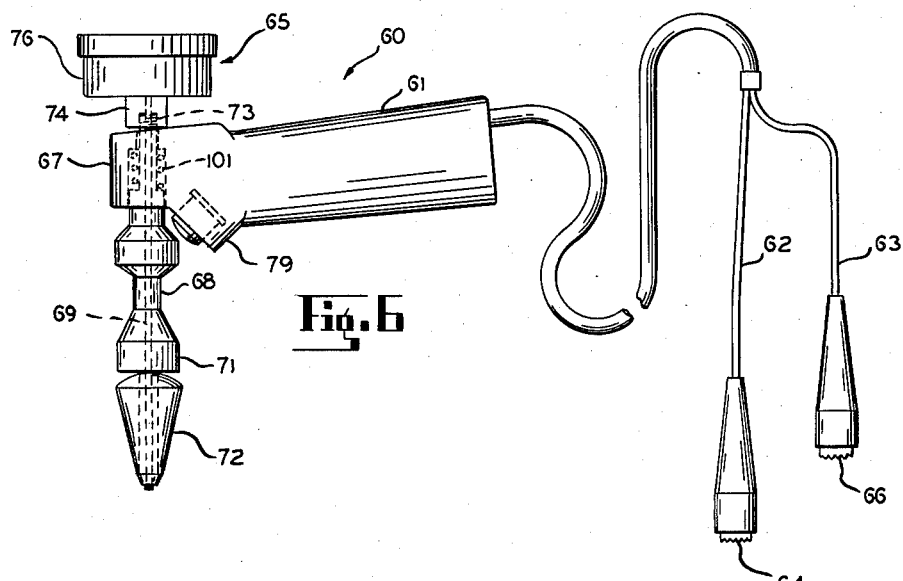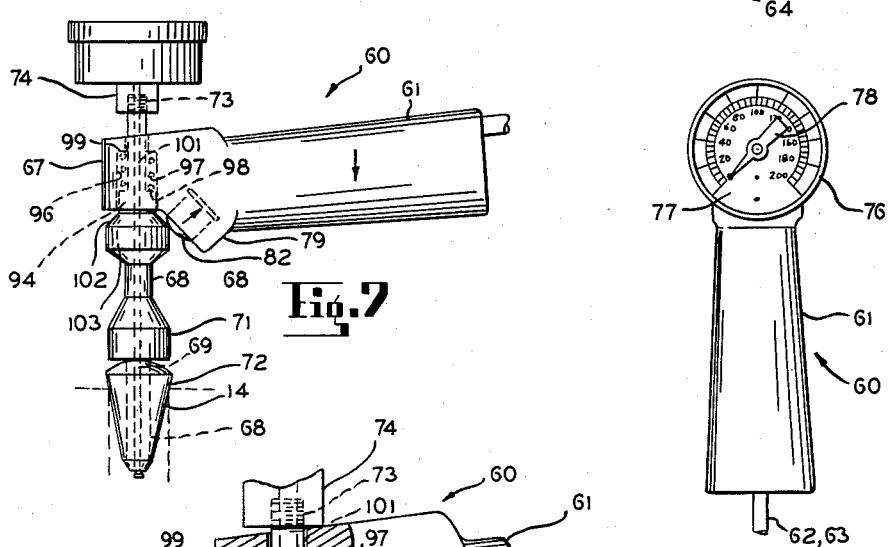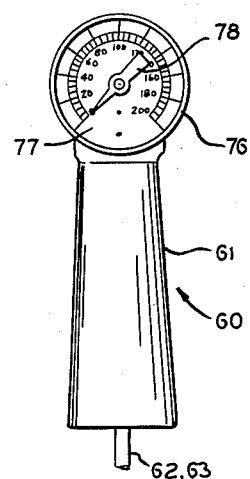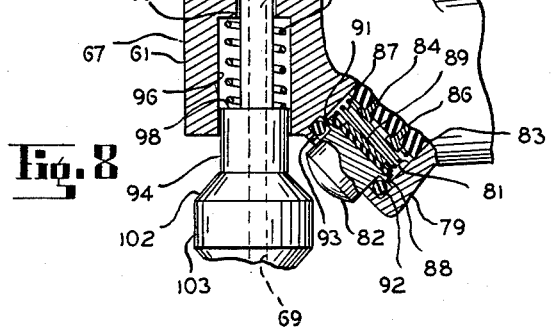
INVENTOR.
RALPH MANSFIELD
ATTORNEYS

3,100,988
APPARATUS FOR MEASURING COMPRESSION OF INTERNAL COMBUSTION ENGINES
Ralph Mansfield, Chicago, Ill., assignor to Auto-Test, Incorporated, Chicago, Ill., a corporation of Illinois
Filed July 9, 1956, Ser. No. 596,761
8 Claims. (Cl. 73—116)

This invention relates generally to devices for measuring the compression of an internal combustion engine, and more particularly to improved devices whereby a single operator can simultaneously crank the engine and measure the compression of same, or whereby more than one operator can perform such operations.

This application is a continuation-in-part of my application Serial No. 469,234, filed November 16, 1954, for Apparatus for Measuring Compression of Internal Combustion Engines, now abandoned.

It is a principal object of this invention to provide apparatus which is selectively employed whereby a single operator can measure engine compression concomitantly with the provision of apparatus whereby a pair of operators can measure such compression, one operator controlling the engine cranking and the other controlling or operating pressure indicating means.

Another object comprehends the provision of apparatus of the aforesaid type wherein ready adjustment thereof may be made for use by one or a pair of operators.

Other objects and important features of the invention will be apparent from a study of the following specification taken with the drawings, which together show some preferred embodiments of the invention, and what are now considered the best modes of practicing the principles thereof. Other embodiments may be suggested to those having the benefit of the teachings herein, and it is intended that such other embodiments be reserved, especially as they fall within the scope of the claims subjoined.

In the drawings:

FIG. 1 is a front elevation view of a device for measuring the compression of an internal combustion engine, said device having the improvements according to the present invention embodied therein;

FIG. 2 is a side elevation view thereof, showing details whereby switch means arranged to be actuated conjointly with the use of the apparatus seen in FIGS. 1 and 2 may be separated therefrom for use by an additional operator to the one using the mechanism seen in FIG. 1;

FIG. 3 is a broken away sectional view of the switch means seen in FIG. 2, said view taken substantially along the line 3—3 of FIG. 2, and looking in the direction of the arrows;

FIG. 4 is a section taken along the line 4—4 of FIG. 1 and looking in the direction of the arrows showing a valve for trapping engine gases within the device shown in FIGS. 1 and 2 for measurement of the pressure thereof, and the details of a resilient bushing for preventing escape of gases at an opening to the compression chamber of an internal combustion engine;

FIG. 5 is a phantom perspective view of an internal combustion engine, together with the starting means therefor, and the means for energizing the starting means, and showing the apparatus according to the present invention in use for the testing of the compression of such internal combustion engine;

FIG. 6 is an elevational view of another form of compression tester, this form of the invention being characterized for use by a single operator, showing the parts in a released position;

FIG. 7 is a view similar to FIG. 6, but showing the tester in position at the spark plug opening with a switch of the tester moved to a position for engine cranking;

FIG. 8 is a section taken along the plane 8—8 of FIG. 7, showing details of the switch for cranking the engine; and FIG. 9 is a plan view of the tester seen in FIG. 6.

Referring now to the drawing, the improved apparatus according to the present invention is referred to generally by the reference numeral 10, and is arranged as seen in FIG. 5 to test the compression within one or more of the cylinders of a multi-cylinder internal combustion engine 11. Such an engine has a starter 12 which is supplied with energy from a battery 13, the starting circuit to such starter not being shown, since it forms no part of the present invention. The apparatus 10 is arranged to measure the compression within one of the cylinders of the engine by placement of the apparatus at a spark plug opening 14 of the engine 12.

Referring now to FIGS. 1 and 2 of the drawing, the apparatus according to the present invention includes a pressure gauge 16 having a graduated dial 17 and a dial indicator 18. Such a pressure gauge may be preferably of the Bourdon type and includes a gauge housing 19 with an entrance nipple 21 thereto which is connected to a tube 22 by means of a coupling 23.

The tube 22 is bent slightly as at 24, so that the apparatus 10 may conveniently be placed at the opening 14 to the combustion chamber in such a fashion that the graduated dial 17 and its housing 19 may be disposed in a direction for grasping thereof by the hand or hands of the operator.

A flange-like ferrule 26 is disposed adjacent the lower end of the tube 22 and provides a seat for a resilient bushing 27, the bushing 27 being tapered in the manner shown as to provide a tight seal at the opening 14 to prevent escape of the gases within the combustion chamber.

The ferrule 26 has a small bore 28 so that it defines a very small volume as compared to the volume of the gases trapped within the combustion chamber, so that the reading on the graduated dial 17 will not be greatly affected, as would be the case if the volume of the bore 28 and the volume of the gauge were relatively large.

As seen in FIG. 4 the lower end of the tube 22 is provided with a valve mechanism indicated generally by the reference numeral 29. This valve mechanism may be constructed substantially like those found for inflating pneumatic tires, except that the valve 29 in this instance has an extremely light spring 31 opposing the entrance of engine gases to the bore 28 so that the very little back pressure of the spring 31 will not materially affect the reading on the dial 17. As is conventional with valves of the general type mentioned, they are arranged to release entrapped gases by means of a valve actuating stem 32, so that any pressurized gases contained within the bore 28 and within the pressure gauge 16 may be released to atmosphere.

Means are provided whereby a single operator may cause the engine 11 to be cranked through a number of revolutions to measure the compression within one of the cylinders, for example cylinder No. 1 as seen in FIG. 5, whilst at the same time the operator may exert enough pressure in a downward direction to maintain the seal at the resilient bushing 27 to prevent escape of engine gases.

It may be noted that the compression of a four cycle internal combustion engine may be of the order of 125 p.s.i., and if the diameter of the opening 14 is of the order of one inch, the downward pressure necessary to maintain a tight seal can be of the order of 100 pounds approximately.

To this end the pressure gauge housing 19 supports on the reverse side 33 thereof a spring clip 34 supporting in turn a switch 36. Said switch has a pair of leads 37 and 38 therefrom terminating in spring clips 39 and 41 respectively. These spring clips 39 and 41 may be connected to appropriate terminals on the battery 13 and the engine starter 12 so as to close a circuit through the starter 12.

The switch 36 includes a cylindrical housing 42 enclosing the leads 37 and 38 which terminate respectively in contact points 43 and 44 within the housing 42. As seen in FIG. 3, the cylindrical housing 42 has a bore 46, and insulating material 47 therein isolates the two leads 37 and 38 from each other. Insulating material 47 forms an abutment for a coil spring 48 which opposes the movement of a switch actuator 49 carrying insulating material 51 and a bridging contact member 52 for the two contacts 43 and 44. The switch actuator 49 has a flange 50 and is held within the bore 46 by means of a C-ring 53 lodged in an annular recess 54 and bearing against the flange 50.

It is believed that the description foregoing would cause one skilled in the art to understand readily the operation of this embodiment of the present invention. In cases where a single operator is measuring the compression of one of the cylinders of the engine 11, the device is arranged in the manner shown in FIG. 5. In such case, the operator inserts the resilient bushing 27 into the opening 14, and whilst pressing upon the gauge housing 19, concomitantly presses the actuator 49 in a downward direction to close the circuit at the contacts 43 and 44 to crank the engine 11 by the starter 12. After the engine has been cranked a sufficient amount to obtain a maximum reading of the pressure within the combustion chamber, the switch actuator 49 may be released to open the circuit to the starter 12, and the device removed from the opening 14.

After the reading has been taken the dial indicator 18 may be returned to the zero position by release of the pressure by actuating the stem 32 seen in FIG. 4.

When more than one operator is employed to measure the pressure, the switch 36 is removed from its supporting spring clip 34 and the first operator can measure the engine compression, whilst the other operator is effecting cranking of the engine 11.

It will thus be seen that there has been provided a new and simple device for measuring the compression of an internal combustion engine, said device being able to perform equally as well whether there are one or two operators.

Referring now to FIGS. 6 to 9 of the drawings, there is shown another embodiment of the invention where the compression testing is done by a single operator. The tester according to this embodiment of the invention is referred to generally by reference numeral 60 and includes an operating handle 61 which enclose a pair of power leads 62 and 63, and which extend from the handle 61 and terminate in clips 64 and 66. Power leads 62 and 63 can be connected in the manner as shown in FIG. 5 to energize the starter 12 of the engine 11.

The operating handle 61 is preferably formed in a casting operation, and has a drilled boss 67 at one end thereof to receive a compression measuring assembly referred to generally by the reference numeral 65. Said assembly consists of a tube 68 having a drilled passageway 69 therein, the lower end of the tube having a ferrule 71 forming a seat for a resilient bushing 72 constructed similarly to the bushing 27 seen in FIG. 4 to provide a tight seal at the spark plug opening 14 seen in FIG. 7. The tube 68 extends within the resilient bushing 72 and is provided at the lower end thereof with a valve mechanism identical in form to that shown in FIG. 4, said valve being for the purpose of trapping gases under pressure at the spark plug opening 14 within the passageway 69.

The upper end of the tube 68 is threaded as at 73 to receive a coupling 74 of a pressure gauge 76 identical in form to the pressure gauge 16 shown in FIG. 1. As with the pressure gauge 16, the pressure gauge 76 has a graduated dial 77 and a dial indicator 78.

The handle 61 also has a boss 79 extending downward therefrom and in a direction toward the tube 68. The boss 79 is drilled as at 81 to receive a switch having a switch actuator 82 and a slug of insulating material 83 which isolates contact members 84 and 86 which are connected respectively to the leads 62 and 63 seen in FIG. 6. The insulating material 83 forms an abutment for a coil spring 87 which opposes the movement of the switch actuator 82, which supports in turn insulating material 88 and a bridging contactor 89 for the two contacts 84 and 86. The actuator 82 has a flange 91, which bears against an O-ring 92 seated in an annular recess 93 in the bore 81. It may be noted that the spring 87 normally biases the switch actuator 82 to a position to open any circuit between the contacts 84 and 86 and the bridging contact 89.

A portion 94 of the tube 68 is guided within a counterbore 96 of the boss 67, and a spring 97 has one end thereof abutting a surface 98 on the portion 94, the other end of the spring 97 abutting a seat 99 in the counterbore 96, the spring 97 encircling a portion of reduced diameter 101 of the tube 68, the portion 101 being threadably connected at 73 to the coupling members 74 of the dial 76.

The spring 97 normally urges the tube 68 in a direction whereby the coupling member 74 is engaged with the boss 67, in a fashion as seen in FIG. 6.

The switch actuator 82 is arranged to cooperate with a frusto-conical surface 102 of an enlarged diameter portion 103 of the tube 68, as seen in FIG. 7, when the handle 61 is urged downward with the resilient bushing 72 sealing the spark plug opening 14. This operation causes the switch actuator 82 to move in the direction indicated by the arrow thereat seen in FIG. 7 to cause bridging by the contact 89 of the two contacts 84 and 86 to complete a circuit with the starter 12 of the engine 11 seen in FIG. 5.

When the tester 60 is in the position seen in FIG. 7 the cranking of the engine can be carried on for an interval long enough to obtain a maximum reading on the graduated dial 77, which reading indicates the compression within the cylinder then being tested. When the tester 60 is removed from the spark plug opening 14 the entire compression assembly is caused to move by the urgence of the spring 97 to release of the switch actuator 82, to open the circuit through the starter 12 seen in FIG. 5, the parts then assuming the position seen in FIG. 8.

After the reading has been taken of the compression of the cylinder the dial indicator 78 can be returned to the zero position by release of the pressure within the passageway 69 and in the gauge 76 by releasing the valve mechanism housed within the resilient bushing 72.

It will thus be seen that according to the embodiment described with reference to FIGS. 6 to 9 of the drawings a single operator can crank the engine and obtain the dial reading. It will be noted that the portion of the switch actuator 82 is achieved by the movement of the handle 61 with respect to the movement of the compression assembly 65, and the operator need give his attention only to the force necessary to seal the spark plug opening at the resilient bushing 72.

While the invention has been described in terms of a number of preferred embodiments thereof, its scope is intended to be limited only by the terms of the claims here appended.

I claim as my invention.

1. Apparatus of the class described for simultaneously cranking an internal combustion engine and measuring the compression in a chamber thereof, said apparatus comprising in combination: measuring means including a pressure sensitive gauge, a tube connecting said gauge with an engine combustion chamber, a resilient bushing supported at one end of said tube for effecting a seal against the escape of gases from a combustion chamber when the gauge is in communication therewith, a manually releaseably valve disposed in said tube for trapping pressurized gases within said tube and gauge, a handle extending angularly from said tube and forming a means of guiding the same, switch means supported by said handle and including a housing having a pair of electrical leads extending therefrom for placing an engine starter in circuit with a source of electrical power, a switch actuator for closing said switch means, said switch actuator being actuated by movement of said handle relative to said tube, whereby when said measuring means is operatively positioned in relation to a combustion chamber opening, and said bushing effects a seal therewith, said switch actuator simultaneously actuates said switch means to close a circuit to crank an engine for a length of time sufficient to obtain a reading on the gauge.

2. Apparatus of the class described for simultaneously cranking an internal combustion engine and measuring the compression in a chamber thereof, said apparatus comprising in combination: measuring means including a pressure sensitive gauge, a tube having one end secured to said gauge for placing the gauge in communication with an engine combustion chamber, an operating handle supporting said measuring means, a resilient bushing carried adjacent the other end of said tube for effecting a seal against the escape of gases from a combustion chamber when the gauge is in communication therewith, a manually releaseable valve disposed in said tube for trapping pressurized gases within said tube and gauge, switch means supported in said operating handle including a pair of electrical leads extending from said operating handle for placing an engine starter in circuit with a source of electrical power, a switch actuator for closing said switch means, and means supported on said tube and causing said switch actuator to move to a position to close said switch means when said measuring means moves relative to said operating handle whereby when said measuring means is operatively positioned in relation to a combustion chamber opening and said bushing effects a seal therewith said switch actuator simultaneously actuates said switch means to close a circuit to crank an engine for a length of time sufficient to obtain a reading on the gauge.

3. The invention as described in claim 2 including means for biasing said measuring means in an opposite direction relative to said operating handle to release said switch actuator and open the circuit through said switch means.

4. Apparatus of the class described for simultaneously cranking an internal combustion engine and measuring the compression in a chamber thereof, said apparatus comprising in combination: measuring means including a pressure sensitive gauge having a tube connecting said gauge to an engine combustion chamber, said tube having a resilient bushing for effecting a seal against the escape of gases from a combustion chamber when the gauge is connected thereto, a handle guiding said tube and including switch means supported by said handle, said switch means including a switch actuator for placing an engine starter in circuit with a source of electric power, said tube and said switch actuator being movable relative to each other for actuation of said switch means when said tube and gauge are operatively positioned in relation to a combustion chamber opening to close a circuit to crank an engine for a length of time sufficient to obtain a reading on said gauge.

5. Apparatus of the class described for simultaneously cranking an internal combustion engine and measuring the compression in a chamber thereof, said apparatus comprising in combination: measuring means including a pressure sensitive gauge having a tube connecting said gauge to an engine combustion chamber, a manually releasable valve disposed in said tube for trapping pressurized gases within said tube and said gauge, said tube having a resilient bushing for effecting a seal against the escape of gases from a combustion chamber when the gauge is connected thereto, a handle guiding said tube and including switch means supported by said handle, said switch means including a switch actuator for placing an engine starter in circuit with a source of electric power, said tube and said switch actuator being movable relative to each other for actuation of said switch means when said tube and gauge are operatively positioned in relation to a combustion chamber opening to close a circuit to crank an engine for a length of time sufficient to obtain a reading on said gauge.

6. Apparatus of the class described for simultaneously cranking an internal combustion engine and measuring the compression in a chamber thereof, said apparatus comprising in combination: measuring means including a pressure sensitive gauge having a tube depending therefrom for placing said gauge in communication with an engine combustion chamber, an operating handle extending angularly from said tube and guiding the same, said tube having a resilient bushing for effecting a seal against the escape of gases from a combustion chamber when the gauge is in communication therewith, switch means supported by said operating handle and having circuit closing means for placing an engine starter in circuit with a source of electric power, said tube and switch means being movable relative to each other when said tube and gauge is placed in operating position at a combustion chamber opening to close said switch means and crank an engine for a length of time sufficient to obtain a reading on said gauge.

7. The invention as described in claim 6 including means for moving said tube in an opposite direction relative to said operating handle to open said circuit.

8. A compression testing device including a body portion having a passage therethrough, a conduit extending through and supported by said passage, a plug connected to one end of said conduit, a compression testing gauge on the other end of said conduit, said plug having an opening therethrough through which pressure may be transmitted to said gauge, a handle extending angularly from said body portion adjacent said gauge, said handle having a chamber therein adjacent said passage, a switch in said chamber, a switch actuating push button slidably supported by said handle projecting from said chamber, test leads connected to said switch and adapted when said push button is actuated to close a circuit to crank an engine, said testing gauge being simultaneously utilizable to ascertain the pressure in a cylinder of said engine.

References Cited in the file of this patent

UNITED STATES PATENTS 2,408,976    Forbragd _____ Oct. 8, 1946
2,620,656    Peterson _____ Dec. 9, 1952

OTHER REFERENCES

Publication, National Tool Co., Jackson, Mich., "Tune Up Equipment," 2 pages, 73–116.